United States Patent [19]
Martin et al.

[11] Patent Number: 6,034,186
[45] Date of Patent: Mar. 7, 2000

[54] OLEFIN POLYMERIZATION PROCESSES AND PRODUCTS THEREOF

[75] Inventors: Joel L. Martin; Steven J. Secora; Elizabeth A. Benham; Max P. McDaniel; Eric Hsieh; Timothy W. Johnson, all of Bartlesville, Okla.

[73] Assignee: Phillips Petroleum Company, Bartlesville, Okla.

[21] Appl. No.: 08/857,788

[22] Filed: May 16, 1997

[51] Int. Cl.$^7$ ...................................................... C08F 2/06
[52] U.S. Cl. ........................ 526/64; 526/124.5; 526/352; 526/903
[58] Field of Search .................... 526/64, 124.5, 526/903

[56] References Cited

U.S. PATENT DOCUMENTS

| | | | |
|---|---|---|---|
| 3,984,387 | 10/1976 | Liu et al. .................................. | 526/74 |
| 4,326,988 | 4/1982 | Welch et al. .............................. | 502/109 |
| 4,347,158 | 8/1982 | Kaus et al. ................................ | 502/105 |
| 4,394,291 | 7/1983 | Hawley .................................... | 502/117 |
| 4,526,943 | 7/1985 | Fuentes, Jr. et al. .................... | 526/133 |
| 4,794,151 | 12/1988 | Mueller-Mall et al. .................. | 526/64 |
| 4,975,485 | 12/1990 | Sato et al. ................................ | 525/53 |
| 5,155,078 | 10/1992 | Kioka et al. ............................. | 502/110 |
| 5,200,379 | 4/1993 | McDaniel et al. ....................... | 502/154 |
| 5,401,820 | 3/1995 | McDaniel et al. ....................... | 526/348.5 |
| 5,500,397 | 3/1996 | Cuffiani et al. .......................... | 502/102 |
| 5,684,097 | 11/1997 | Palmroos et al. ........................ | 526/64 |

*Primary Examiner*—David W. Wu
*Attorney, Agent, or Firm*—Lynda S. Jolly

[57] ABSTRACT

A novel loop/slurry olefin polymerization process is provided which produces ultra high molecular weight ethylene homopolymer.

14 Claims, 1 Drawing Sheet

OLEFIN POLYMERIZATION PROCESSES AND PRODUCTS THEREOF

BACKGROUND

This invention relates to olefin polymerization processes and the resultant polymer products.

Ultra high molecular weight olefin polymers such as polyethylene are useful in many demanding and extremely critical applications, such as human joint replacements, gears, bullet proof vests, skis, and other applications. Since ultra high molecular weight the polymer cannot be pelletized after leaving the reactor, the polymer must be sold as a fluff or a powder. Therefore, particle size and toughness of the resultant polymer is critical.

Many commercial methods are available to produce olefin polymers, such as polyethylene. One of the most economical routes to most commercial grades of olefin polymers is a loop/slurry process with a paraffin diluent wherein the polymerization process carried out at a temperature low enough that the resulting polymer is largely insoluble in the diluent. It is believed that commercially acceptable ultra high molecular weight polyethylenes traditionally are made using a stirred tank process, in a heavy hydrocarbon diluent.

SUMMARY OF THE INVENTION

It is an object of this invention to provide a very tough ultra high molecular weight polyethylene.

It is a further object of this invention to provide an improved olefin polymerization process.

It is yet another object of this invention to provide an improved polymerization process for preparing ultra high molecular weight polyethylene.

In accordance with this invention, a process is provided to polymerize ethylene in a loop/slurry process using a Ziegler/Natta-type catalyst system to produce a very tough ultra high molecular weight polyethylene.

In accordance with another embodiment of this invention, a very tough, ultra high molecular weight polyethylene is provided.

Figure 1:
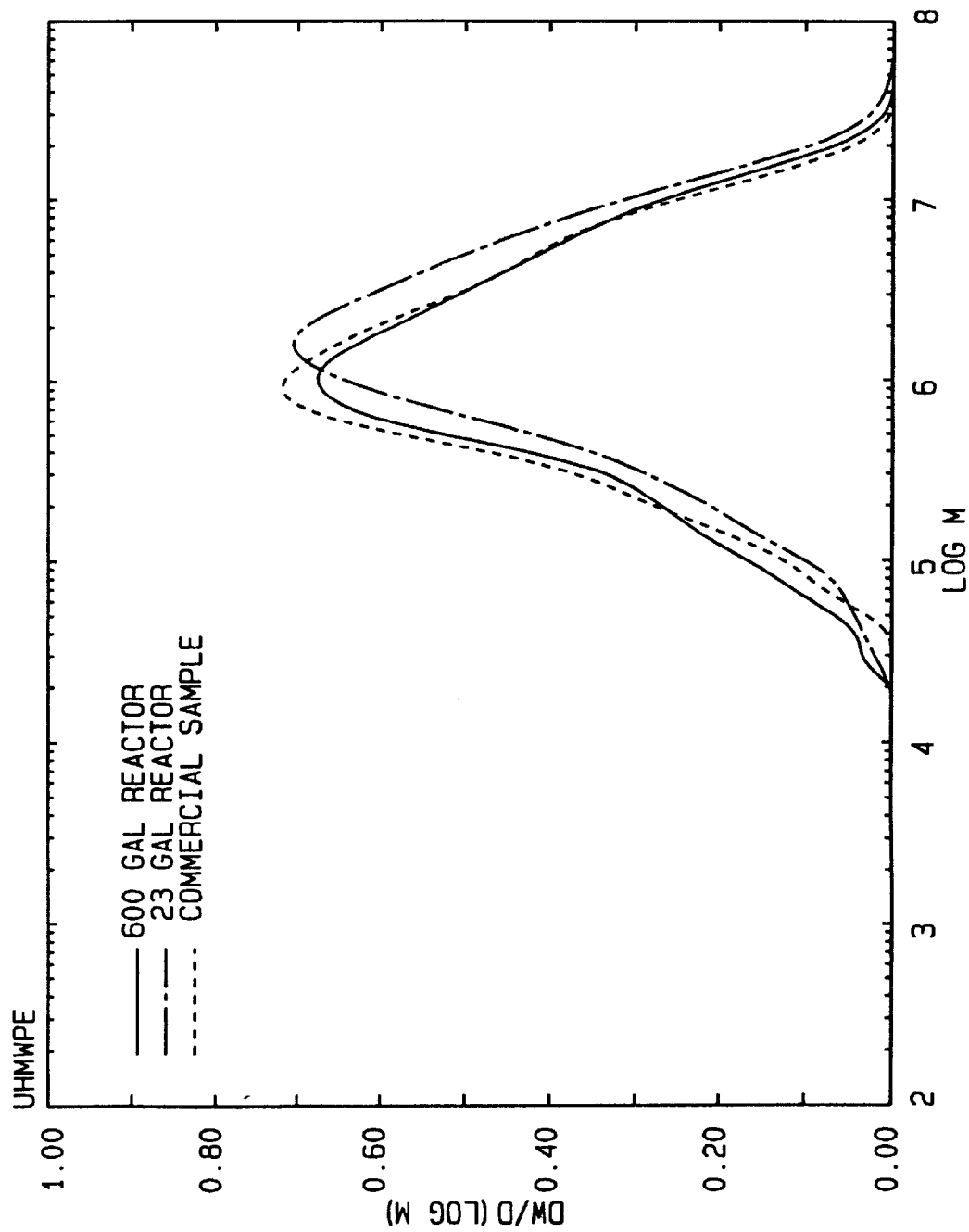
FIG. 1 shows three (3) molecular weight distributions obtained from size exclusion chromatography (SEC) of three different polyethylene samples. "UHMWPE" designates ultra high molecular weight polyethylene.

The x-axis, labeled "LOG M", is the log of the polyethylene molecular weight. The y-axis, labeled "DW/D(LOG M)", is the differential mass fraction. Two curves, designated as "600 Gallon Reactor" and "23 Gallon Reactor", are curves of ethylene homopolymers prepared in accordance with the novel, inventive process. The third curve, designated as "Commercial Sample," is a commercially available polyethylene, GUR 4150 made by Hoechst Celanese USA.

DESCRIPTION OF THE PREFERRED EMBODIMENTS

Catalyst System

Generally, the catalyst system used in the present invention must be a titanium-containing catalyst system, commonly referred to as "Ziegler-Natta" catalysts. Commercially available titanium catalyst systems typically comprise complexes of titanium halides with organometallic compounds, such as aluminum alkyls. Exemplary magnesium/titanium catalyst systems include, but are not limited to, those disclosed in U.S. Pat. No. 's. 4,394,291; 4,326,988; and 4,347,158, herein incorporated by reference.

Preferably, the catalyst system is a titanium-containing catalyst and is deposited on an inorganic oxide support. As used in this disclosure, the term "support" refers to a carrier for another catalytic component. Any support useful to support catalyst systems can be used. Exemplary catalyst supports include, but are not limited to, inorganic oxides, either alone or in combination, phosphated inorganic oxides, and mixtures thereof. Particularly preferred are supports selected from the group consisting of silica, silica-alumina, alumina, fluorided alumina, silated alumina, thoria, aluminophosphate, aluminum phosphate, phosphated silica, phosphated alumina, silica-titania, coprecipitated silica/titania, fluorided/silated alumina, and mixtures thereof. Preferably, the catalyst system support comprises silica, titania, alumina, either alone or in combination and either modified or unmodified.

The presently most preferred catalyst system support is a silica-containing support. As used in this application, the reference to silica means a silica-containing material generally composed of 80 to 100 weight percent silica, the remainder, if any, being selected from alumina, boria, magnesia, thoria, zirconia, or mixtures thereof. For instance, the silica-containing material can consist essentially of silica and no more than 20 weight percent of alumina, titania or other metal oxide. Other ingredients which do not adversely affect the catalyst system, or which are present to produce some unrelated result, also can be present.

As stated previously, the particle size of the polymer fluff is critical. In accordance with this invention, it has been found that a correct selection of particle size of the catalyst system particles can control the particle size of the resultant polymer fluff. Usually, catalyst system particles are within a range of about 1 to about 40 microns, preferably within a range of about 2 to about 20 microns. Most preferably, in order to have a correctly sized polymer product, catalyst particles are kept within a size range of about 4 to about 16 microns.

Titanium usually is present in the catalyst system in an amount within a range of about 0.01 to about 5 weight percent, preferably within a range of about 0.1 to about 2.5 weight percent, based on the total mass of the catalyst system (support plus titanium compound). Most preferably, titanium is present in the catalyst system in an amount within a range of 0.2 to 1 weight percent based on the total mass of the catalyst system for best catalyst system activity and productivity, as well as best polymer product particle size.

The titanium-containing catalyst is combined, preferably in the reactor, with an aluminum alkyl cocatalyst, expressed by the general formulae $AlR_3$, $AlR_2X$, and/or $AlRX_2$, wherein R is an alkyl group having from about 1 to about 12 carbon atoms per molecule and X is a halogen atom. Exemplary aluminum alkyl cocatalysts include, but are not limited to triethylaluminum (TEA), triisobutyl aluminum (TIBAL), diethylaluminum chloride (DEAC), ethylaluminum sesquichloride (EASC), and mixtures of two or more thereof. Preferably, the cocatalyst is a trialkyl aluminum cocatalyst, such as TEA, TIBAL and mixtures thereof for best catalyst system activity and reactivity.

If used, a cocatalyst can be present in the reactor in an amount within a range of about 5 to about 500 mg/kg (ppm), based on the weight of diluent, such as isobutane in the reactor. Preferably, a cocatalyst, if used is present in the reactor in an amount within a range of about 50 to about 100 mg/kg in order to optimize catalyst activity and productivity. Precontacting catalyst and cocatalyst can occur, but is not required. While not wishing to be bound by theory, it is believed that precontacting catalyst system and cocatalyst can reduce the quantity of cocatalyst used in the reactor.

Reactants

The polymers produced in accordance with the process of this invention are predominately homopolymers of ethylene. Trace amounts of comonomers can be present, but comonomers preferably are not present in any significant amount since comonomers can reduce the molecular weight of the desired ultra high molecular weight polymer product. Preferably, the ethylene concentration in the polymerization reactor is within a range of from about 2 weight percent to about 15 weight percent, based on the total liquid contents of the reactor. Most preferably, the ethylene concentration in the polymerization reactor is within a range of from about 4 to about 7 weight percent. While ethylene concentration does not significantly affect the molecular weight of the resultant polymer, higher or lower ethylene concentration can effect catalyst activity.

Polymerization Process

Polymerization of the monomer must be carried out under loop/slurry, also known as particle form, polymerization conditions wherein the temperature is kept below the temperature at which polymer swells. Such polymerization techniques are well known in the art and are disclosed, for instance, in Norwood, U.S. Pat. No. 3,248,179, the disclosure of which is herein incorporated by reference. A loop polymerization process is much more preferred than a stirred tank reactor because diluent can be flashed off, eliminating the necessity of separating polymer product from solvent, greater heat transfer surface of the loop reactor, much more versatility for plant operation, and often less polymer swelling during polymerization.

The temperature of the polymerization reactor, or reaction zone, according to this invention, is critical and must be kept within a range of about 150° F. to about 180° F., preferably within a range of about 160° to about 170° F. Most preferably, the reaction zone temperature is within a range of 162° to 168° F. The temperature range is critical in order to produce an ultra high molecular weight polyethylene. Too high of a reactor temperature can produce a polymer with too low of a molecular weight; too low of a reactor temperature can make the polymerization process inoperable because a lower reactor temperature can be difficult to maintain due to the exothermic polymerization reaction, flashing off reactor diluent can be difficult, and a can produce a polymer with a commercially unacceptable molecular weight.

The loop/slurry process used in this invention must be carried out in an inert diluent (medium), selected from the group consisting of hydrocarbons having three and four carbon atoms per molecule. Exemplary diluents include, but are not limited to propane, n-butane, isobutane, and mixtures thereof. Diluents having greater or less than three or four carbon atoms per molecule can be difficult to separate from the polymer product during the polymer recovery process. Isobutane is the most preferred diluent due to low cost and ease of use.

Pressures in the loop/slurry process can vary from about 110 to about 1000 psia (0.76–4.8 MPa) or higher, preferably 500 to 700 psia. The catalyst system is kept in suspension and is contacted with ethylene at a sufficient pressure to maintain the medium and at least a portion of the ethylene in a liquid phase. The reactor medium and temperature thus are selected such that the polymer is produced and recovered as solid particles. Catalyst system concentrations in the reactor can be such that the catalyst system content ranges from 0.0001 to about 0.1 weight percent based, on the weight of the reactor contents.

Hydrogen never is added to the polymerization reactor because hydrogen has too great of an effect on the molecular weight of the resultant polymer.

Products

Polymers produced in accordance with this invention are considered a homopolymer of ethylene, even though trace, insignificant amounts of comonomers can be present in the resultant polymer. Polymers produced according to this invention have an ultra high weight average ($M_w$) molecular weight, generally above one million (1,000,000). Preferably, polymers produced in accordance with this invention have a molecular weight within a range of greater than about two million (2,000,000) and most preferably, within a range of greater than or equal to about 2,500,000 up to about 10,000,000.

Since the molecular weight of these polymers is so high, the polymers will exhibit a value of zero (0) for both the melt index (MI) and high load melt index (HLMI). The inherent viscosity (IV) of the polymers generally is greater than about 19, preferably within a range of about 20 to about 30. Most preferably, the polymers will have an IV within a range of 22 to 28.

The density of these novel polymers usually is within a range of about 0.92 g/cc to about 0.94 g/cc, preferably from about 0.925 to about 0.936 g/cc. Most preferably, the polymer density is within a range of about 0.927 to about 0.933 g/cc.

Another critical, defining physical characteristic of these polymers is the fluff, or powder, size. Usually, the particle size is less than about 400 microns (40 mesh), preferably within a range of about 400 microns to about 40 microns (300 mesh). Most preferably, the particle size is within a range of about 50 to about 400 microns. Particle sizes of larger that about 400 microns often can appear in the in the finished product as a flaw, or a white patch. While not wishing to be bound by theory, it is believed that this defect appears because the particles are not molded by typical methods in the art, but are merely fused together by compression. Fine, or small, particles can inhibit transport of the powder through conveyor blowers because the fine particles can cling to walls by static and can plug downstream filters due to blowover.

Polymers produced according to this invention must be very tough, as evidenced by a sand wheel abrasion test, tensile strength, elongation, flexural modulus, hardness and Izod impact strength. The most important of these tests is the sand wheel abrasion test wherein a plaque of compression molded polymer is subjected to sanding and the amount of polymer lost is measured. Generally, the compression molded polymer sample loss is less than or equal to about 150 grams, preferably, less than about 140 grams. Most preferably, the compression molded polymer sample loses between zero (0) and 125 grams.

Polymer tensile strength at yield is within a range of about 15 to about 30 MPa, preferably, within a range of about 19 to about 24 MPa. Most preferably, as an indicator of toughness, the tensile strength at yield is within a range of 20 to 24 MPa. Tensile strength at break usually is greater or equal to about 30 MPa, preferably greater than about 35 MPa. Most preferably, as an indicator of toughness, the tensile strength at break is greater than 38 and less than 75 MPa.

Izod impact usually is greater or equal to about 45 kJ/m$^2$, preferably greater than about 50 kJ/m$^2$. Most preferably, as another indicator of toughness, the Izod impact is within a range of about 55 to about 200 kJ/m$^2$. Izod impact is not only related to the polymer itself, but also is an indicator of how well the polymer particles fuse, or knit, together during the fusion process. Polymers having too high a molecular weight can have poor Izod impact strength because of poor fusion. Thus, Izod impact strength often can go through a maximum as molecular weight is increased.

Another critical property of these novel, ultra high molecular weight polymers include physical appearance, such as cleanliness and whiteness. High bulk density also is important because bulk density is related to the amount of compression of the polymer during fusion. A low bulk density can inhibit and slow down processing rates. Generally, polymers produced in accordance with this invention have a bulk density of greater than about 0.25 g/cc, preferably, greater than about 0.3 g/cc. Most preferably, polymer bulk density is within a range of 0.35 to 1 g/cc.

A further understanding of the present invention and its advantages are provided by reference to the following examples.

EXAMPLES

Example 1

Ethylene homopolymers were prepared in a continuous particle form process by contacting the catalyst with ethylene, employing a liquid full loop reactor, having a volume of 23 gallons (87 liters), isobutane as the diluent; no hydrogen or comonomer were added to the reactor. The reactor was operated to have a residence time of 1.25 hrs. The reactor temperature was 164° F. (73.3° C.), unless stated differently, and the pressure was 4 MPa (580 psi). At steady state conditions, the isobutane feed rate was 46 1/hr, the ethylene feed rate was about 30 lbs/hr, with a reactor ethylene concentration within a range of about 3.5 to about 5 weight percent. Polymer was removed from the reactor at the rate of 22 lbs/hr. The catalyst systems used were commercially available catalyst systems purchased from W. R. Grace and Company, the Davison business unit, designated as Davison Sylopol® 5910, having an average particle size of 10 microns. Sales literature for Sylopol® 5910 provides a chemical analysis (weight percent) of 15.16% Cl, 4.44% Al, 2.95% Mg, 0.60% Ti and a Mg/Ti molar ratio of 9.69. Generally, the catalyst system is a silica-supported Ziegler-Natta catalyst, also described as a Ziegler-Natta catalyst deposited on silica. Triethyl aluminum (TEA) cocatalyst was present in the reactor at 50 mg/kg, based on the weight of the isobutane feed.

Polymer product was collected from each run and passed through a 40 mesh (400 micron) screen to remove large particles. The sieved product was blended with 0.4 weight percent, based on the weight of polymer, calcium stearate (Ca St) by tumbling. Sieved and CaSt blended samples were compression molded and tested according to the following procedures:

Density (g/ml): ASTM D 1505-68 and ASTM D 1928, Condition C. Determined on a compression molded sample, cooled at about 15° C. per minute, and conditioned at room temperature for about 40 hours.

High Load Melt Index (HLMI)(g/10 min): ASTM D1238-95, condition E, determined at 190° C. with a 21,600 gram weight.

Bulk Density (lbs/ft$^3$): ASTM D1895-89.

Tensile Strength ((MPa): ASTM D638-86.

Elongation (%): ASTM D638-86.

Izod Impact, notched (kJ/m$^2$): ASTM D256(a)-84.

Flexural Modulus (MPa): ASTM D790-95a.

Tensile Impact (kJ/m$^2$): ASTM D1822-89.

Sand Wheel Abrasion (grams lost, g): ASTM D65-94. Lower values are more desirable, as an indication of resistance to abrasion.

Shore D Hardness: ASTM D2240-86.

Intrinsic Viscosity (dl/g): ASTM D4020-92, modified by using 0.015 wt % dissolved polymer rather than 0.05 wt %. The change is made to get better dissolution of polymer, which can be difficult to dissolve. This procedure includes a definition of ultrahigh molecular weight polymers.

Molecular Weight Distribution: Molecular weights and molecular weight distributions were obtained using a Waters 150 CV gel permeation chromatograph with trichlorobenzene (TCB) as the solvent, with a flow rate of 1 mL/minute at a temperature of 140° C. BHT (2,6-di-tert-butyl-4-methylphenol) at a concentration of 1.0 g/L was used as a stabilizer in the TCB. An injection volume of 220, $\mu$L was used with a nominal polymer concentration of 0.3 g/l (at room temperature). Dissolution of the sample in stabilized TCB was carried out by heating at 160–170° C. for 20 hours with occasional, gentle agitation. The column was two Waters HT-6E columns (7.8×300 mm). The columns were calibrated with a broad linear polyethylene standard (Phillips Marlex® BHB 5003) for which the molecular weight had been determined.

Polymer properties are given in Table 1.

TABLE 1

| Property | Result |
| --- | --- |
| Density, g/cc | 0.931 |
| Bulk Density, lbs/ft$^3$ | 24 |
| Tensile Strength, Yield, MPa | 22.4 ± 0.3 |
| Tensile Strength, Break, MPa | 43.7 ± 1.0 |
| Elongation, % | 232 ± 5 |
| Izod Impact, kJ/m$^2$ | 59 ± 3 |
| Tensile Impact, kJ/m$^2$ | 2545 ± 82 |
| Flexural Modulus, MPa | 727 ± 26 |
| Sand Wheel Abrasion | 90 ± 7 |
| Shore D Hardness | 70 |

The data in Table 1 show that the resultant polymer has desirable properties, such as a low bulk density, high tensile strength and a low sand wheel abrasion test result.

Example 2

Polymer was prepared as described in Example 1, but ethylene concentration in the reactor was varied from about 2 weight percent to about 8 weight percent. All other variable remained constant. The results are given in Table 2.

TABLE 2

| Effect of Ethylene Concentration | | | | |
| --- | --- | --- | --- | --- |
| Run | 201 | 202 | 203 | 204 |
| Ethylene Conc: (wt %) | 2.2 | 4.75 | 6.7 | 7.25 |
| Density (g/cc) | 0.9317 | 0.9312 | 0.9308 | 0.9311 |
| Bulk Density (lbs/ft3) | 25.6 | 24.2 | 24.2 | 24.2 |
| Avg Particle Size (microns) | 165 | 247 | 251 | 279 |
| Finer than 100 mesh (wt %) | 58 | 41 | 37 | 30.3 |

TABLE 2-continued

Effect of Ethylene Concentration

| Run | 201 | 202 | 203 | 204 |
|---|---|---|---|---|
| Finer than 200 mesh (wt %) | 29 | 15.8 | 15.7 | 10.1 |
| Larger than 35 mesh (wt %) | 1.6 | 7.7 | 7.7 | 8.7 |
| Activity (ppm Ti) | 1.1 | 0.8 | 0.5 | 0.5 |

The data in Table 2 show that ethylene concentration in the reactor does not affect polymer molecular weight, as evidenced by density and bulk density. However, the polymer particle size varied significantly. The data demonstrate that as ethylene concentration increased, the catalyst became more active and larger polymer particles were produced, as evidenced by particle size distribution measurements. Thus, ethylene concentration can be used to control polymer particle size.

Size exclusion chromatography (SEC) results are shown in FIG. I. The curve designated as "23 Gallon Reactor" is exemplary for all products made in the above-described 23 gallon reactor. All 23 gallon reactor samples analyzed by SEC have a weight average molecular weight ($M_w$) of greater than or equal to about 3,000,000.

Example 3

Another run was made, under similar conditions to those described in Example 1. The same catalyst system described in Examples 1 and 2 was used in Runs 301–307; the catalyst system used in Runs 311–313 was similar to the catalyst system described in Examples 1 and 2, but the particle size was between 4 and 16 microns; the catalyst system used in Runs 321–326 was similar to the catalyst system described in Examples 1 and 2, but the particle size was between 4 and 16 microns and the titanium level was decreased to make the catalyst less active. Ethylene concentration, again, was varied between 0.65 and 10 weight percent and no hydrogen was introduced. Reactor temperatures were about 164° F., unless stated differently. The results of these runs are given below in Tables 3, 4 and 5.

TABLE 3

Effect of Ethylene Concentration with Sylopol ® 5910

| Run | 301 | 302 | 303 | 304 | 305 | 306 | 307 |
|---|---|---|---|---|---|---|---|
| Ethylene Conc: (wt %) | 0.65 | 2.0 | 2.5 | 3.8 | 4.9 | 7.5 | 8.9 |
| Density (g/cc) | 0.9327 | 0.9316 | 0.9318 | 0.9308 | 0.9310 | 0.9310 | 0.9308 |
| Bulk Density (lbs/ft$^3$) | 23.4 | 25.2 | 24.2 | 25.6 | 24.5 | 23.4 | 24.2 |
| Avg Particle Size (microns) | 81 | 140 | 172 | 156 | 193 | 257 | 226 |
| Finer than 100 mesh (wt %) | 87.0 | 80.0 | 65.3 | 60.5 | 69.7 | 44.1 | 48.5 |
| Finer than 200 mesh (wt %) | 69.0 | 29.4 | 23.6 | 29.6 | 16.8 | 9.7 | 10.3 |
| Larger than 35 mesh (wt %) | 0.32 | 0.9 | 1.89 | 1.61 | 4.0 | 8.0 | 3.8 |
| Activity (ppm Ti) | 9.7 | 2.2 | 1.3 | 1.0 | 0.6 | 0.4 | 0.4 |

TABLE 4

Effect of Ethylene Concentration with Specifically Tailored Catalyst (4-16 Micron and Low Titanium)

| Run | 311 | 312 | 313 |
|---|---|---|---|
| Ethylene Conc: (wt %) | 4.5 | 6.9 | 10.6 |
| Density (g/cc) | 0.9320 | 0.9319 | 0.9319 |
| Bulk Density (lbs/ft$^3$) | 26.3 | 26.6 | 25.2 |
| Avg Particle Size (microns) | 164 | 220 | 163 |
| Finer than 100 mesh (wt %) | 66.6 | 31.5 | 65.6 |
| Finer than 200 mesh (wt %) | 6.9 | 7.6 | 7.6 |
| Larger than 35 mesh (wt %) | 0.54 | 1.39 | 0.68 |
| Activity (ppm Ti) | 1.2 | 0.6 | 0.9 |

TABLE 5

Effect of Reactor Temperature

| Run | 321 | 322 | 323 | 324 | 325 | 326 |
|---|---|---|---|---|---|---|
| Ethylene Conc: (wt %) | 4.5 | 4.0 | 3.4 | 3.4 | 4.5 | 5.3 |
| Temperature °F. | 164 | 174 | 185 | 205 | 220 | 225 |

TABLE 5-continued

Effect of Reactor Temperature

| Run | 321 | 322 | 323 | 324 | 325 | 326 |
|---|---|---|---|---|---|---|
| Density (g/cc) | 0.9322 | 0.9339 | 0.9378 | 0.9412 | 0.9433 | 0.9435 |
| Bulk Density (lbs/ft$^3$) | 27.0 | 25.9 | 26.6 | 27.0 | 28.5 | 28.8 |
| Avg. Particle Size (microns) | 199 | 206 | 245 | 263 | 266 | 267 |
| Particles finer than 100 mesh (%) | 34 | 30 | 22 | 13.5 | 13 | 17 |
| Particles finer than 200 mesh (%) | 8.1 | 6.6 | 4.2 | 2.3 | 2.8 | 3.6 |
| Particles larger than 35 mesh (%) | 0.43 | 0.38 | 1.25 | 0.48 | 0.58 | 1.85 |
| Activity (ppm Ti) | 0.8 | 0.7 | 0.4 | 0.2 | 0.2 | 0.4 |

The data in Table 3 demonstrate the effects of ethylene concentration on polymer density, bulk density and average polymer particle size.

The data is Table 4 show that the effect of ethylene concentration with a catalyst system having a particle size within a range of 4 to 16 microns and low titanium content.

The data in Table 5 show the effect of reactor temperature and that higher temperatures can increase polymer density.

Example 4

Ethylene homopolymers were prepared in a continuous particle form process by contacting the catalyst with ethylene, as described above, but a larger reactor was used. The liquid full loop reactor had a volume of 600 gallons (2271 liters), isobutane was the diluent; no hydrogen or comonomer were added to the reactor. The reactor was operated to have a residence time of about 1.25 hrs. The reactor temperature was 164° F. (73.3° C.), unless stated differently, and the pressure was 4.14 MPa (600 psi). Polymer was removed from the reactor at the rate of 800 to 1000 lbs/hr. The catalyst systems used were the same as those described above, Davison Sylopol® 5910. Triethyl aluminum (TEA) cocatalyst was present in the reactor at 75 mg/kg, based on the weight of the isobutane feed.

Polymer product was collected from each run and treated as described above. Polymer product then was analyzed for physical properties, however sample preparation was different than described above. For Runs 401–403, a polymer plaque was prepared by pressing 460 grams of polymer at 420° F. for 60 minutes, then cooling for 30 minutes, all at 1000 psi. Intrinsic viscosity (IV) was determined as described above. The results of the analyses are listed below in Table 6.

TABLE 6

Ultrahigh Molecular Weight Polyethylene Properties

| Property | Run 401 | Run 402 | Run 403 | Commercial Sample A[a] | Commercial Sample B[b] |
|---|---|---|---|---|---|
| Density, g/cc | 0.932 | 0.932 | 0.931 | 0.932 | 0.929 |
| Tensile Strength, Yield, MPa | 21.2 | 20.0 | 19.8 | 22 | 20.4 |
| Tensile Strength, Break, MPa | 36.4 | 34.6 | 35.0 | 41.7 | 39.9 |
| Elongation, % | 240 | 228 | 211 | 287 | 345 |
| Izod Impact, kJ/m$^2$ | 59 | 63 | 50 | 55.3 | 90.6 |
| Tensile Impact, kJ/m$^2$ | 2334 | 2290 | 2283 | 1890 | 2400 |
| Flexural Modulus, MPa | 770 | 804 | 772 | 712 | 606 |
| Flexural Strength, MPa | 770 | 804 | 772 | 712 | 606 |
| Sand Wheel Abrasion | 107 | 107 | 108 | 106 | 96 |
| IV, 1st analysis | 23.7 | 25.1 | 24.4 | N/A | N/A |
| IV, 2d analysis | 24.9 | 23.7 | 24.3 | N/A | N/A |
| IV, average | 23.2 | 19.7 | 21.4 | 28 | 27 |

[a]Sample is 1900CM, made by Montell USA.
[b]Sample is GUR 4150, made by Hoechst Celanese USA.
N/A = not available The data in Table 6 shows that polymers produced in accordance with the invention have high inherent viscosity (IV) values and are polymers of ethylene having ultrahigh molecular weights.

Size exclusion chromatography (SEC) results are shown in FIG. I. The curve designated as "600 Gallon Reactor" is exemplary for all products made in the above-described 600 gallon reactor. All 600 gallon reactor samples analyzed by SEC have a weight average molecular weight ($M_w$) of greater than or equal to about 2,500,000. Note that the curve designated as a "Commercial Sample" had a similar SEC curve as that of the 600 gallon reactor sample.

While this invention has been described in detail for the purpose of illustration, it is not to be construed as limited thereby but is intended to cover all changes and modifications within the spirit and scope thereof.

That which is claimed is:

1. A loop/slurry polymerization process comprising contacting in a reaction zone, at a temperature within a range of about 150° F. to about 180° F. in the presence of a hydrocarbon diluent having three or four carbon molecules per molecule, and in the absence of hydrogen:
   a) ethylene monomer;
   b) a catalyst system comprising a magnesium compound and a titanium halide, wherein both the magnesium compound and the titanium halide are supported on an inorganic oxide support and said catalyst system has a particle size within a range of about 1 to about 40 microns; and
   c) an aluminum alkyl cocatalyst;
   and recovering a homopolymer of ethylene, wherein said homopolymer of ethylene has a weight average molecular weight greater than about one million (1,000,000) and a high load melt index of 0 g/10 minutes.

2. A process according to claim 1 wherein said reaction zone temperature is within a range of about 160° F. to about 170° F.

3. A process according to claim 1 wherein said inorganic oxide support is selected from the group consisting of silica, silica-alumina, alumina, fluorided alumina, silated alumina, thoria, aluminophosphate, aluminum phosphate, phosphated silica, phosphated alumina, silica-titania, coprecipitated silica/titania, fluorided/silated alumina, and mixtures thereof.

4. A process according to claim 3 wherein said inorganic oxide is a silica-containing support selected from the group consisting of silica, silica-alumina, phosphated silica, silica-titania, coprecipitated silica/titania, fluorided/silated alumina, and mixtures thereof.

5. A process according to claim 4 wherein said support is essentially silica.

6. A process according to claim 1 wherein said catalyst system particle size is within a range of about 2 to about 20 microns.

7. A process according to claim 6 wherein said catalyst system particle size is within a range of about 4 to about 16 microns.

8. A process according to claim 1 wherein said aluminum alkyl cocatalyst has the general formulae $AlR_3$, $AlR_2X$, or $AlRX_2$, wherein R is an alkyl group having from about 1 to about 12 carbon atoms per molecule and X is a halogen atom.

9. A process according to claim 8 wherein said aluminum alkyl cocatalyst is selected from the group consisting of triethyl aluminum, triisobutylaluminum chloride, diethyl aluminum chloride, ethylaluminum sesquichloride, and mixtures thereof.

10. A process according to claim 9 wherein said aluminum alkyl cocatalyst is selected from the group consisting of triethyl aluminum, triisobutyl aluminum and mixtures thereof.

11. A process according to claim 1 wherein said aluminum alkyl cocatalyst is present in the reactor in an amount within a range of about 5 to about 500 mg/kg, based on the mass of hydrocarbon diluent in the reactor.

12. A process according to claim 1 wherein said catalyst system and aluminum alkyl cocatalyst are contacted prior to contacting said ethylene.

13. A process according to claim 1 wherein said diluent is isobutane.

14. Process according to claim 1 wherein said homopolymer of ethylene comprises a polymer having:
   a) a weight average molecular weight greater than about one million;
   b) an inherent viscosity greater than about 19;
   c) a particle size less than about 400 microns;
   c) a density within a range of about 0.92 g/cc to about 0.94 g/cc;
   d) a high load melt index of 0 g/10 minutes;
   e) a sand wheel abrasion loss as determined by ASTM D65-94 of less than about 150 grams.

* * * * *